Nov. 10, 1970 T. A. HANSEN 3,540,004

BUFFER STORAGE CIRCUIT

Filed July 5, 1968 3 Sheets-Sheet 1

INVENTOR
THEODORE A. HANSEN
BY [signature]
ATTORNEY

Nov. 10, 1970 T. A. HANSEN 3,540,004

BUFFER STORAGE CIRCUIT

Filed July 5, 1968 3 Sheets-Sheet 3

United States Patent Office 3,540,004
Patented Nov. 10, 1970

3,540,004
BUFFER STORAGE CIRCUIT

Theodore A. Hansen, Park Ridge, Ill., assignor to Teletype Corporation, Skokie, Ill., a corporation of Delaware Filed July 5, 1968, Ser. No. 742,888
Int. Cl. G11c *19/00*
U.S. Cl. 340—172.5 7 Claims

ABSTRACT OF THE DISCLOSURE

A multi-stage buffer storage circuit in the form of a multi-level, multi-stage shift register is placed between the parallel output of a keyboard or a receiving distributor and a transmitting distributor for the purpose of interfacing between a slow speed input and a relatively high speed output. Information is obtained from the register on demand of an external facility, such as a computer; and information is shifted through the register to an output stage or a subsequent stage under the control of high-speed shift pulses. If a stage of the register already has information stored in it, the shifting pulses are blocked from shifting additional information into that stage. If a plurality of subsequent stages of the register are empty at the time information is stored in the input stage, the information rapidly is shifted through succeeding stages into the output stage or the last stage which has no information stored in it.

BACKGROUND OF THE INVENTION

In keyboard operated teletypewriters, a transmitting distributor is utilized to provide an even or constant rate output from the teletypewriter, even though the rate at which the keys in the keyboard are operated may be uneven. Even though the average speed of operation employed by the operator may be lower than the average speed at which the transmitting distributor operates, most operators are capable of producing occasional bursts of typing speed which exceed the average speed of operation of the transmitting distributor. In order to prevent the erroneous transmission of information from the keyboard in such instances, it has been the practice in the past to provide some type of keyboard locking device to prevent the depression of a key until the transmitting distributor has completed transmitting the information conveyed by the depression of the previous key. Because keyboard locking devices operating in this manner prevent the typing of bursts of characters, they tend to cause the operator to slow down in all typing; so that maximum use of the capabilities of the teletypewriter by a particular operator often is not achieved. Even if a general slowdown of typing speed is not induced by the lock-up devices, the locking up of keys during short bursts of information continues to be annoying to an operator, forcing an awareness of the teletypewriter keyboard which normally is not forced upon an operator in the operation of a typewriter keyboard.

In addition, a need has arisen for utilizing a teletypewriter keyboard or receiving distributor as an input device for a computer being operated on a time-sharing network. In such a system, the computer demands information in short high-speed bursts from a transmitting distributor, while it is necessary to permit a low speed input to the system from the keyboard or telegraph line.

SUMMARY OF THE INVENTION

A multi-stage buffer storage register is placed between the output of an input device and the parallel input to a transmitting distributor for the purpose of interfacing between an input of one speed and an output of a different speed. Information presented to the input of the register is shifted at high speed through the register to the nearest available empty stage, and information is obtained from the output on demand. As soon as a stage of the register is emptied of information, any information in earlier stages of the register immediately is shifted to the stage just emptied; so that the latest information always is available at the output stage of the register.

DETAILED DESCRIPTION

Figure 1A:
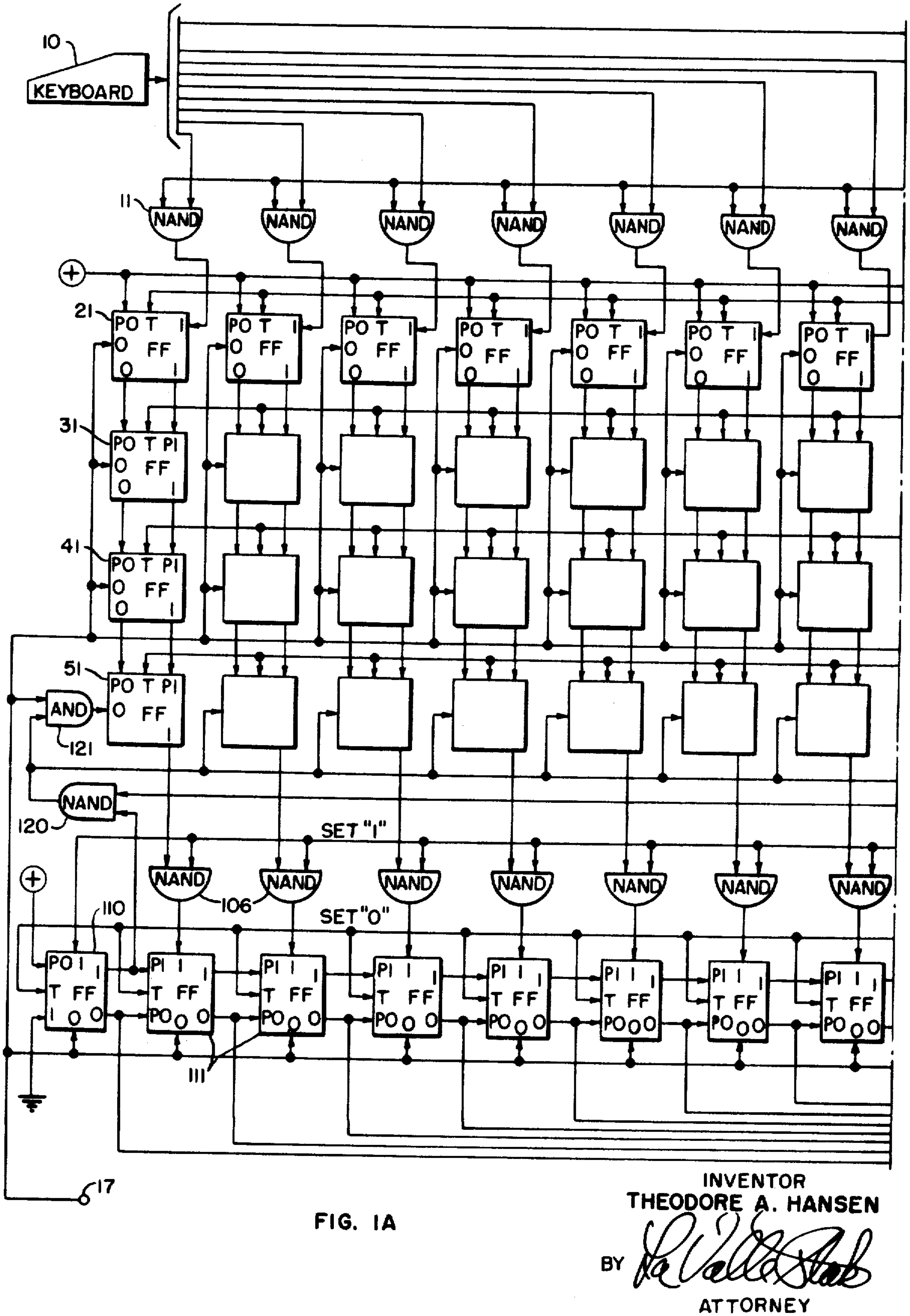
FIGS. 1*a* and 1*b*, when assembled as shown in FIG. 1*c*, show a block diagram of a preferred embodiment of the invention.
Figure 1B:
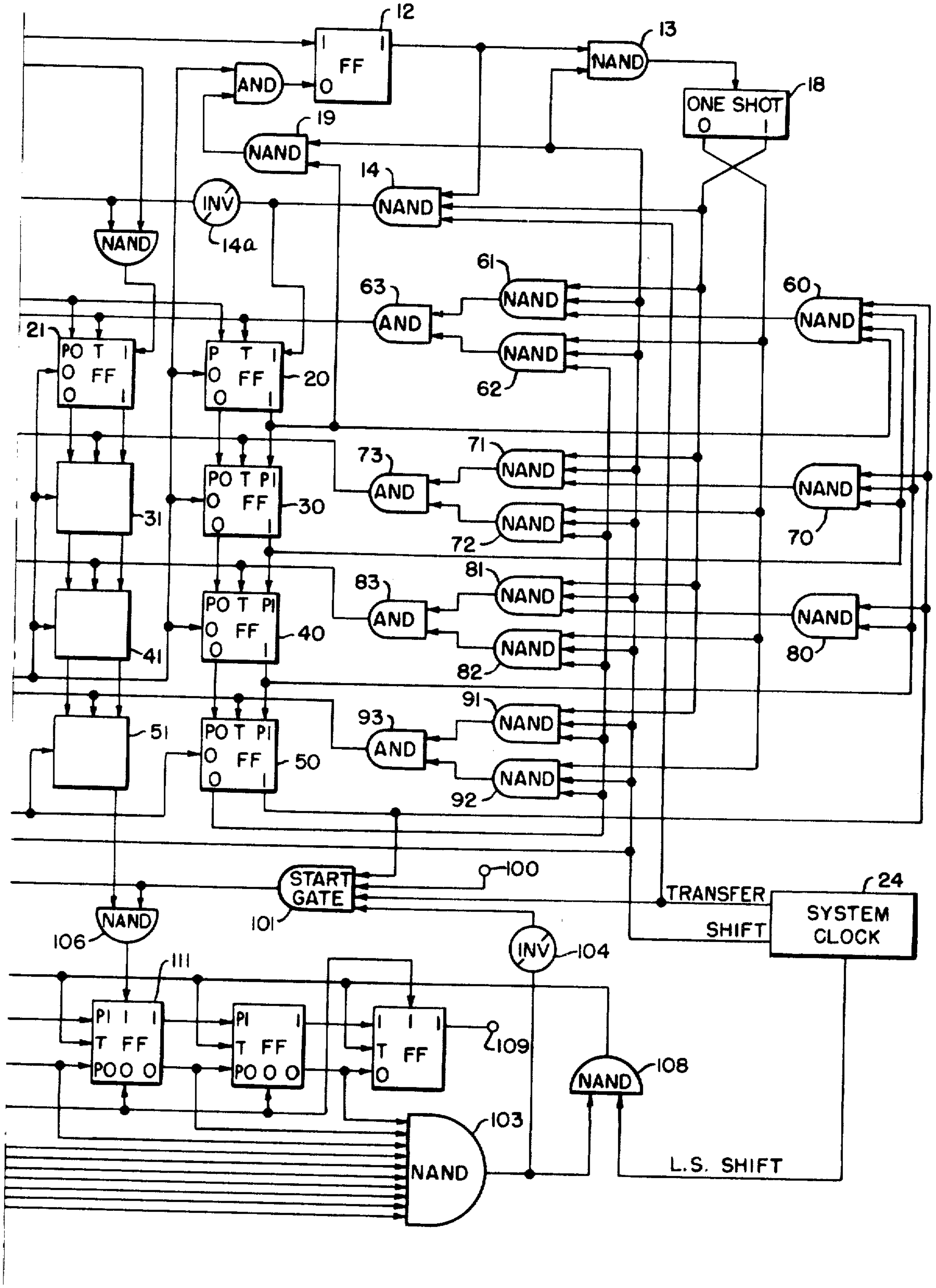
Figure 1C:
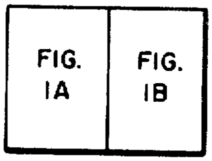

In the description of the preferred embodiment of the invention shown in FIG. 1, the terms positive and negative potentials are used to indicate the relative binary potentials employed in the operation of the circuit. These terms are chosen for purposes of illustration only and are not to be considered limiting, since ground potential and negative potential or positive potential and ground potential also could be employed to provide the same relative binary values. The flip-flops used in the circuit are conventional DTL flip-flops requiring positive priming inputs in combination with a positive-to-negative transition on a corresponding trigger input in order to store the signal present on the priming inputs in the flip-flop. In addition, these flip-flops may be set directly to either state by the application of a trigger pulse to set "1" or set "0" inputs.

Referring now to the drawing, there is shown a suitable keyboard input device 10 which provides an 8-level parallel-coded output in response to the operation of each key in the keyboard. This output is a permutation code in which "marks" or binary ones are represented by a positive potential on a corresponding output lead from the keyboard and "space" or binary zeroes are represented by a negative potential on a corresponding output lead. The 8-level output of the keyboard is supplied in parallel to the inputs of eight NAND gates 11, one NAND gate 11 being provided for each level of the output signals obtained from the keyboard 10. Normally all of the keyboard outputs are at a negative potential, so that operation of a key in the keyboard 10 causes positive potentials to be applied to selected ones of the NAND gates 11 in accordance with the code combination represented by the particular key which was operated.

Figure 2:
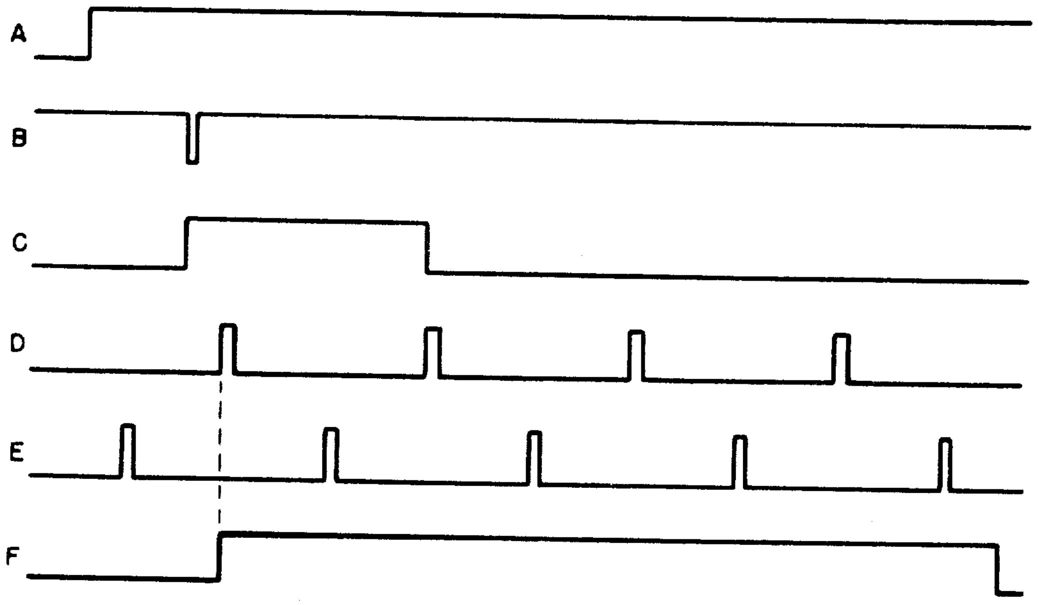
FIG. 2 is a timing diagram illustrating the relative occurrence of events in the operation of the circuit shown in FIGS. 1*a* and 1*b*.

Shortly after the selected positive potentials are presented to the inputs of the NAND gates 11 (this transition being indicated in waveform A of FIG. 2), a negative trigger pulse of a short duration (shown in waveform B of FIG. 2) is applied to the set "1" input of a control flip-flop 12 to set the flip-flop 12 to its "1" state, causing the "1" output thereof to rise from a normally negative potential to a positive potential (see waveform C of FIG. 2). A positive output of the flip-flop 12 then enables a pair of NAND gates 13 and 14. Control of the storage of information in the buffer storage register is effected by operation of a system clock 24 which provides a sequence of high-speed shift pulses and high-speed transfer pulses on a pair of leads 15 and 16, respectively. These shift and transfer pulses are obtained from a two-phase clock and are approximately 180° out of phase with one another and occur at the same frequency, as shown in waveforms D and E of FIG. 2. Although the system clock 24 normally is continuously running, the shift and transfer pulses applied to the inputs of the NAND gates 13 and 14, respectively, are ineffective to change the outputs of these gates so long as the output of the flip-flop 12 is negative. As soon as this output becomes positive, however, the first positive shift pulse obtained over the lead 15 causes the output of the NAND gate 13 to drop from a normally positive potential to a negative potential, triggering a one-shot multivibrator 18 into its non-stable state. This causes the outputs of the multivibrator 18 to change from a condition where the "0" output is positive and the "1" output is negative to a condition where the "0" output is negative and the "1" output is positive. This change of conditions of the "1" output of the multivibrator 18 is shown in waveform F of FIG. 2.

The now positive potential obtained from the "1" output of the one-shot multivibrator 18 is combined with the now positive output obtained from the control flip-flop 12 to enable the NAND gate 14 to pass the next subsequent high-speed transfer pulse appearing on line 16, causing the output of the NAND gate 14 to change from a normally positive potential to a negative potential. This negative output transition then sets a first permanently-primed storage control flip-flop 20 to its "1" state, indicating that a character is being stored in the first stage of the buffer storage shift register. When this occurs, the "1" output of the flip-flop 20 becomes positive and the "0" output thereof becomes negative.

The output of the NAND gate 14 is inverted by an inverter **14*a* to a positive potential at the time of the application of the transfer pulse. This positive pulse from the inverter 14*a* is applied to one of the inputs of each of the NAND gates 11, resulting in positive-to-negative signal transitions appearing at the outputs of all of the NAND gates 11 having a positive input applied thereto from the outputs of the keyboard 10. Those NAND gates 11 having negative inputs applied thereto by the keyboard 10 continue to have a positive output potential throughout this portion of the operation of the circuit, so that no signal transition occurs at the outputs thereof. For those NAND gates 11 having a positive-to-negative output signal transition, however, a set "1" trigger pulse is applied to the inputs of corresponding permanetly-primed storage flip-flops 21 in the first stage of the buffer storage shift register to cause these selected flip-flops 21 to be set to the "1" state. At this time, it should be noted that when the system initially is placed into operation, a negative "clear" pulse is applied to an input terminal 17, from which it is distributed to all of the buffer storage flip-flops, the control flip-flop 12, the storage control flip-flops and the flip-flops in the transmitting distributor to set these flip-flops to their "0" states (with the exception of the output flip-flop in the transmitting distributor which is set to its "1" state). Thus, those flip-flops 21 not having a negative trigger pulse applied thereto from the output of a corresponding NAND gate 11** remain set to their "0" states, indicating the storage of a "space" or "0" binary condition therein.

The next shift pulse which appears after this storage of the first character caused by the transfer pulse is passed by a NAND gate 19 having a positive input applied to its other input from the now positive "1" output of the storage control flip-flop 20, causing a positive-to-negative transition to occur at the output of the NAND gate 19. This negative pulse is passed by an AND gate 17 and is applied to the set "0" trigger input of the flip-flop 12 to set the flip-flop 12 to its "0" state as indicated in waveform C of FIG. 2. Thus, the input control flip-flop 12 is ready to initiate the operation of the next cycle for storing the next input character obtained from the keyboard 10.

Assume for purposes of illustration, however, that no new data is available at the input of the keyboard 10 at this time. All of the stages of the buffer storage register are empty and the storage flip-flops are set to their "0" states, with the exception of the first stage containing the buffer storage flip-flops 21 which are storing the first character in the manner discussed above. Since the output of the flip-flop 12 is now negative, the NAND gate

14 provides a continuous positive output, irrespective of the appearance of the high-speed transfer pulses applied thereto; so that no additional storage of the same input character can be effected. Since no characters are stored in the final three stages of the shift register, storage control flip-flops 30, 40 and 50 for these subsequent stages all are set to their "0" states causing a negative output to be obtained from the "1" outputs thereof. The "1" outputs of all of the storage control flip-flops 20, 30, 40, 50 are supplied in parallel to the input of a shift control NAND gate 60, the output of which is connected to one of three inputs of a NAND gate 61. It should be noted that the output of the NAND gate 60 remains positive until all of the inputs thereto are positive, indicating that the buffer storage register is full when a negative output is obtained therefrom. Similarly, NAND gates 70 and 80 in the next subsequent stages are supplied with the "1" output of the storage control flip-flops 30, 40, 50 of stages subsequent to them and are connected to the inputs of NAND gates 71 and 81, respectively. In the final stage, the output of the flip-flop 50 is connected directly to one input of a NAND gate 91 which corresponds to the NAND gates 61, 71 and 81 for the other stages.

The next positive shift pulse appearing on the lead 15, following the storage of the first character in the flip-flops 21, is applied to the NAND gates 61, 71, 81 and 91, causing a positive-to-negative transition or shift pulse to be obtained from each of these gates. This occurs due to the fact that one of the three inputs to each of these NAND gates is the positive input obtained from the "1" output of the one-shot multivibrator 18, and the second input to each of these gates is obtained from the corresponding NAND gates 60, 70, 80 for the first three stages of the register, and is obtained from the "0" output of the storage control flip-flop 50 of the last stage of the register for the NAND gate 91. At this time, all of these inputs to the NAND gates 61, 71, 81 and 91 are positive, since all but the first stage of the register are empty at this time. Thus, positive-to-negative transitions occur at the outputs of each of the NAND gates 61, 71, 81 and 91 and are applied to one of the inputs of a corresponding set of AND gates 63, 73, 83 and 93. The other inputs to the gates 63, 73, 83 and 93 are obtained from a corresponding set of NAND gates 62, 72, 82 and 92 the outputs of which are positive at this time since one input thereof is obtained from the now negative "0" output of the one-shot multivibrator 18.

The outputs of the flip-flops 21 in the first stage of the buffer register are supplied as priming inputs to corresponding flip-flops 31 in the second stage of the register, with the outputs of the flip-flops 31 being supplied to flip-flops 41 in the third stage of the register, and with the outputs of the flip-flops 41 being supplied to the inputs of corresponding flip-flops 51 in the fourth stage of the register. Thus, as soon as the positive-to-negative pulse transition occurs at the output of the NAND gate 71 associated with the second stage of the shift register, the output of the AND gate 73 likewise drops from a positive potential to a negative potential, causing a trigger input pulse to be supplied to the storage control flip-flop 30 and to the buffer storage flip-flops 31 in the second stage of the shift register. The information previously stored in the first stage of the shift register then is shifted into the second stage of the shift register. At the same time, the storage control flip-flop 30 is set from its "0" to its "1" state, since it also is primed by the outputs of the storage control flip-flop 20. Although this first shift pulse also is passed by the AND gates 83 and 93, it has no effect on the operation of the control flip-flops 40 and 50 and the buffer storage flip-flops 41 and 51 since the priming inputs to all of these flip-flops are the "0" outputs of the preceding stages, and since these flip-flops all previously were set to their "0" states by the initial clock pulse applied to the terminal 17.

The shift pulse passed by the AND gate 63, however, does operate to set all of the flip-flops 20 and 21 to their "0" states since the "0" priming inputs to these flip-flops all are permanently connected to a positive potential. Thus, this first shift pulse which followed the storage of the information in the first stage of the shift register is effective to transfer the information from the first stage to the second stage of the register. If no additional input signals are supplied from the keyboard, the next shift pulse operates in a similar manner to transfer the information from the flip-flops 30 and 31 to the flip-flops 40 and 41; and the next subsequent shift pulse transfers the information from the flip-flops 40 and 41 to the flip-flops 50 and 51.

As soon as the character is stored in the last stage of the shift register, the storage control flip-flop 50 is set from its "0" state to "1" state causing a negative potential to be obtained from its "0" output which in turn forces the outputs of the NAND gates 62, 72, 82 and 92 to remain at a positive potential. The negative potential obtained from the "0" output of the flip-flop 50 also is applied to the input of the NAND gate 91, forcing the output of that gate to remain at a positive potential; so that it is unaffected by the subsequent application of shift pulses thereto. Assume that another character then appears at the output of the keyboard 10, with the first character now being stored in the output stage. The operation of the control flip-flop 12 is the same as before, and it is set to its "1" state upon the occurrence of the auxiliary input pulse. When the next shift pulse occurs, it is applied to the input of the one-shot multivibrator 18 by the NAND gate 13 to trigger the multivibrator 18 into its non-stable state, if it already is not in that state. This permits the next transfer pulse to be passed by the NAND gate 14, causing the storage of the first character in the flip-flops 21 and causing the setting of the storage control flip-flop 20 back to its "1" state. Subsequent shift pulses then are passed by the NAND gates 61, 71, 81 in the same manner described previously to rapidly shift the information from the storage flip-flops 21 through to the storage flip-flops 41. It should be noted, however, that since the storage control flip-flop 50 was set to its "1" state when the first character was stored in that register, no shift pulses are applied to the trigger inputs of the flip-flops 50 and 51; so that the first character is stored undisturbed during the time that the second character is being shifted down through the register.

When this second character is stored in the storage flip-flops 41, the flip-flop 40 is set to its "1" state, causing a positive potential to be obtained from the "1" output thereof which is combined with the positive potential obtained from the "1" output of the flip-flop 50 to cause the output of the NAND gate 80 to drop from a positive to a negative potential and remain at a negative potential. This then disables the NAND gate 81, forcing its output to remain positive, which, combined with the now positive output of the NAND gate 82, causes the output of the AND gate 83 to remain positive. Thus, shift pulses applied to the system when it is in this condition now have no effect on either of the last two stages of the storage register including the storage flip-flops 41 and 51. In a similar manner, it can be seen that the NAND gates 60 and 70 prevent the application of shift pulses to those stages of the register with which they are associated when those stages are filled with information which cannot be shifted into subsequent stages due to the fact that the subsequent stages also are full.

As soon as the output utilization device is ready to accept information or is ready to accept the next character, a positive potential is applied to an input terminal 100, constituting one of four inputs to a start NAND gate 101. Another of the inputs to the NAND gate 101 is obtained from the "1" output of the storage control flip-flop 50; and in the example presently under consideration, this output now is positive. The third input to the start NAND gate 101 is obtained from a character NAND gate 103 after being inverted by an inverter 104. The inputs to the character NAND gate 103 are obtained from the "0" outputs of a plurality of flip-flops 110 and 111 connected in the form of a shift register operating as a transmitter distributor. When this shift register is empty, all stages, thereof are set to the "0" state causing a negative output to be obtained from the NAND gate 103 which, after being inverted by the inverter 104, causes a positive potential to be applied to the third input of the start NAND gate 101. The fourth input to the NAND gate 101 is the high-speed transfer pulse; and when this pulse occurs, with the system in the condition presently under consideration, all of the inputs to the NAND gate 101 are positive, causing the output of the NAND gate 101 to drop to a negative potential momentarily. This negative potential then is supplied to the set "1" input of the flip-flop 110 setting that flip-flop to its "1" state. This, in turn, causes the output of the NAND gate 103 to become positive and to remain positive until the set "1" state supplied to the flip-flop 110 is shifted completely through the transmitter distributor to the output stage thereof.

The output of the start NAND gate 101 also is supplied in parallel to a plurality of character transfer NAND gates 106, the other inputs to which are obtained from the corresponding "1" outputs of the buffer storage flip-flops 51 in the final stage of the buffer storage register. Thus any one of the flip-flops 51 storing a "mark" or a "1" therein provides a positive potential to the input of its corresponding NAND gate 106. As soon as the output of the NAND gate 101 returns to a positive potential, upon termination of the high-speed transfer pulse or upon the occurrence of a positive output from the NAND gate 103, those NAND gates 106 having a positive enabling potential applied thereto from the corresponding flip-flops 51 provide a positive-to-negative signal transition on their outputs, and this signal transition then sets corresponding flip-flops 111 of the transmitter distributor to the "1" state. Those flip-flops 111 associated with a NAND gate 106 having a negative negative potential applied thereto from the corresponding flip-flop 51 in the final stage of the buffer storage register remain set to their "0" state to which they were set by the application of the initial "clear" pulse on the terminal 17.

The next shift pulse following the transfer pulse which reads the information from the flip-flops 51 into the flip-flops 111 is applied to the input of a NAND gate 120, the other input to which is the now positive "1" output of the flip-flop 110. Thus, the output of the NAND gate 120 drops to a negative potential and is supplied to the input of an AND gate 121, the other input to which is the now positive potential being applied to the terminal 17. As a consequence, the output of the AND gate 121 drops from a normally positive potential to a negative potential and is applied to the clear or set "0" inputs of the character-ready flip-flop 50 and the buffer storage flip-flops 51 to set these flip-flops to their "0" states. When this occurs, a positive potential is applied to the inputs of the NAND gates 62, 72, 82 and 92 from the "0" output of the flip-flop 50 and is applied to the input of the NAND gate 91 thus enabling the NAND gate 91 to respond to the next high-speed shift pulse obtained from the system clock 24. Thus, the characters stored in the preceding stages of the buffer storage register may be shifted down into the final stages thereof in the same manner described previously.

At the same time that the buffer storage register is causing the next character to be available at the output stage consisting of the storage flip-flops 51, a positive enabling potential is applied to a shift control NAND gate 108, the other input to which is a series of relatively low-speed positive shift pulses. These low-speed shift pulses occur at a rate of approximately 1/10 or 1/20 of the rate of occurrence of the high-speed shift and high-speed transfer pulses. The first positive low-speed shift pulse applied to the NAND gate 108 causes a positive-to-negative transition to occur at the output thereof which operates as a trigger pulse to set the flip-flop 110 to its "0" state, since the "0" priming input input thereof is permanently connected to a source of positive potential. In addition, each low-speed shift pulse passed by the NAND gate 108 causes the information in the transmitter distributor to be shifted one stage to the right, with output signals being obtained from the "1" output of the final stage thereof and appearing on an output terminal 109. It should be noted that since the flip-flop 110 is set to its "0" state upon the occurrence of each of these low speed shift pulses, the register is being cleared to its set "0" state from left to right; so that until all of the stages are set to "0," with the exception of the last one then storing the "1" condition to which the flip-flop 110 initially was set, the output of the NAND gate 103 remains positive. Thus, no high-speed transfer pulses can be passed by the start gate 101, and the shift gate 108 remains enabled. As soon as the transmitter distributor shift register consisting of the flip-flops 110 and 111 is cleared to the "0" state, with the exception of the final stage thereof, all of the inputs to the NAND gate 103 are positive, causing a negative output potential to be obtained therefrom which blocks further passage of low-speed shift pulses by the NAND gate 108. At the same time, this inverted negative output is applied as a positive enabling potential to the start gate 101, and if information is available in the final stage of the shift register as indicated by a set "1" condition of the character-ready flip-flop 50, and if the output utilization device is ready to accept the next character as indicated by a positive potential on the terminal 100, the next high-speed transfer pulse obtained from the system clock 24 is passed by the start gate 101 to initiate the transfer of the next character from the flip-flops 51 to the flip-flops 111, which in turn sets in motion the next cycle of operation of the transmitting distributor.

It should be noted that if no input signals are obtained from the keyboard 10 for a period of time of a sufficient duration to enable the one-shot multivibrator 18 to revert back to its "0" state, the NAND gates 61, 71, 81 and 91 which passed the high-speed shift pulses are disabled by the now negative input applied thereto from the "1" output of the one-shot multivibrator 18. As a consequence, if all of the information from the storage register had not been read out at this time, no transfer of information from the stages 21, 31 and 41 of the storage register could be made to the flip-flops 51 of the final stage thereof. In order to overcome this problem, the NAND gates 62, 72, 82 and 92 are provided and are supplied with shift pulses in the same manner as are the NAND gates 61, 71, 81 and 91. These NAND gates 62, 72, 82 and 92 are enabled by a positive output from the "0" output of the one-shot multivibrator 18 and also by a positive output obtained from the "0" output of the storage control flip-flop 50. As long as these conditions exist, shift pulses can be passed by the NAND gates 62, 72, 82 and 92 to shift information from input stages of the buffer storage register to the output stage thereof in the same manner as occurs when the one-shot multivibrator is set to its "1" state, and shift pulses are passed by the NAND gates 61, 71, 81 and 91.

The circuit shown in FIG. 1 and described above is directed to a buffer storage unit to be placed between a keyboard and an output utilization device preferably in the form of a transmitting distributor. The rate at which the shift pulses transfer characters from the input of the storage unit to the output is chosen to be much in excess of the highest speed bursts of typing likely to occur in the operation of the keyboard, so that mechanical "locking" of the keyboard is made unnecessary. It also should be noted that this circuit can be provided between an input obtained from a conventional telegraph line and an output utilization device in the form of a computer to provide a buffer capable of supplying characters to the computer at high speed bursts far in excess of the operating speed of the input telegraph line.

Although a particular embodiment of the invention is shown in the drawing and is described in the foregoing specification, other modifications of the invention, varied to fit particular operating conditions, will be apparent to those skilled in the art; and the invention is not to be considered limited to the embodiments chosen for purposes of disclosure, but it covers all changes and modifications which do not constitute departures from the true scope of the invention.

What is claimed is:

1. A buffer storage circuit interposed between a source of input signals and an output including:
   a shift register having a plurality of stages for storing a plurality of serially-received signals, one of said stages being an input stage and another of said stages being an output stage;
   means for supplying input signals to the input stage of the shift register;
   means for transferring signals through the shift register from the input stage to the output stage thereof;
   means for obtaining signals from the output stage of said shift register; and
   means responsive to the presence of a signal stored in a stage of the shift register for inhibiting the transfer of signals into such a stage whenever a signal already is stored therein.

2. Apparatus according to claim 1 wherein said signals are in the form of permutation-coded, multi-level, parallel signals and wherein said shift register is a multi-level, multi-stage shift register, having a number of levels equal to the number of levels in the signals.

3. Apparatus according to claim 1 wherein said input signals are supplied to the input stage of the shift register at a first rate and wherein the means for obtaining signals may obtain said signals from the output stage of said register at a different rate.

4. Apparatus according to claim 1 wherein the means for transferring signals from the input of said shift register to the output includes a clock pulse source supplying shift pulses to the register.

5. Apparatus according to claim 4 wherein the means for inhibiting the transfer of signals into a stage of the register is a means for inhibiting the application of shift pulses to that stage.

6. A buffer storage circuit between a source of multi-level signals supplied to the storage circuit at a first predetermined rate and a utilization device obtaining information from the buffer storage circuit at a second predetermined rate including:
   a multi-stage, multi-level shift register;
   means for supplying permutation-coded, parallel, multi-level input signals to an input stage of the shift register;
   a source of shift pulses;
   means for supplying said shift pulses to the stages of the shift register to transfer information supplied to the input stage of said register to subsequent empty stages of said register;
   means responsive to the presence of signals in the output stage of said shift register for controlling the transfer of information out of the register; and
   means responsive to the presence of signals stored in the stages of the shift register for inhibiting the supplying of shift pulses to any stage of the shift register already having a signal stored therein.

7. A circuit according to claim 6 wherein the source of shift pulses supplies pulses at a rate which is substantially in excess of the rate at which either said input signals are supplied to said register or said output is taken from said register.

References Cited

UNITED STATES PATENTS

| | | | |
|---|---|---|---|
| 2,951,233 | 8/1960 | Tanco et al. | 340—172.5 |
| 3,291,910 | 12/1966 | Nicklas et al. | 340—172.5 |
| 3,292,153 | 12/1966 | Barton et al. | 340—172.5 |
| 3,348,209 | 10/1967 | Brooks | 340—172.5 |
| 3,362,014 | 1/1968 | Hauck | 340—172.5 |
| 3,470,539 | 9/1969 | Proud et al. | 340—172.5 |

PAUL J. HENON, Primary Examiner

P. R. WOODS, Assistant Examiner